(12) United States Patent
Jeong et al.

(10) Patent No.: US 12,157,828 B2
(45) Date of Patent: Dec. 3, 2024

(54) METHOD FOR MANUFACTURING INK FOR PHOTONIC ANNEALING, AND METHOD FOR MANUFACTURING SURFACE-FUNCTIONALIZED METAL FILM

(71) Applicant: UNIVERSITY-INDUSTRY COOPERATION GROUP OF KYUNG HEE UNIVERSITY, Yongin-si (KR)

(72) Inventors: Sun Ho Jeong, Yongin-si (KR); Ye Jin Jo, Anyang-si (KR); Sang Hyeok Bae, Yongin-si (KR); Ji Yu Shim, Hwaseong-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 18/319,873

(22) Filed: May 18, 2023

(65) Prior Publication Data
US 2023/0374331 A1    Nov. 23, 2023

(30) Foreign Application Priority Data
May 20, 2022   (KR) ........................ 10-2022-0061819

(51) Int. Cl.
| | | |
|---|---|---|
| C09D 11/52 | (2014.01) | |
| B41M 5/00 | (2006.01) | |
| C09D 11/037 | (2014.01) | |
| H01B 1/02 | (2006.01) | |

(52) U.S. Cl.
CPC ............ *C09D 11/52* (2013.01); *B41M 5/0058* (2013.01); *C09D 11/037* (2013.01); *H01B 1/02* (2013.01)

(58) Field of Classification Search
CPC ........ C09D 11/52; C09D 11/037; H01B 1/02; B41M 5/0058
See application file for complete search history.

(56) References Cited

U.S. PATENT DOCUMENTS

| | | | | |
|---|---|---|---|---|
| 2015/0072162 A1* | 3/2015 | Hersam | .................... | H01B 1/24 252/511 |
| 2016/0251805 A1* | 9/2016 | Depres | .................... | D21H 19/60 427/58 |
| 2017/0081537 A1* | 3/2017 | Hersam | ................. | C09D 11/322 |
| 2018/0010001 A1* | 1/2018 | Hersam | .................. | C09D 11/36 |
| 2020/0032088 A1* | 1/2020 | Seyed Jamali | ........ | C09D 11/38 |
| 2020/0187350 A1* | 6/2020 | Depres | .................. | B32B 29/005 |
| 2021/0332489 A1* | 10/2021 | Claussen | ............... | C01B 32/205 |
| 2021/0398808 A1* | 12/2021 | Hersam | ............. | H01L 21/02628 |
| 2023/0128623 A1* | 4/2023 | Capitao | ............. | A61B 5/14546 600/347 |

FOREIGN PATENT DOCUMENTS

| | | | | |
|---|---|---|---|---|
| FR | 3041649 | * | 9/2015 | ............. C09D 11/52 |
| KR | 10-2012-0132111 A | | 12/2012 | |
| KR | 10-2015-0118801 A | | 10/2015 | |

OTHER PUBLICATIONS

Loosli, Frederic, et al., "Adsorption of TiO2 Nanoparticles at the Surface of Micron-Sized Latex Particles. pH and Concentration Effects on Suspension Stability". Journal of Colloid Science and Biotechnology vol. 1, 1-9, 2012, pp. 1-9.*
Secor, Ethan B., et al., "Rapid and Versatile Photonic Annealing of Graphene Inks for Flexible Printed Electronics". Advanced Materials, 2015, 27, 6683-6688.*
Drahi, E., et al., "Impact of ink synthesis on processing of inkjet-printed silicon nanoparticle thin films: A comparison of Rapid Thermal Annealing and photonic sintering". Thin Solid Films 574 (2015) 169-176.*
Majee, Subimal, et al., "Highly Conductive Films by Rapid Photonic Annealing of Inkjet Printable Starch-Graphene Ink". Advanced Materials Interfaces, 2022, 9, 2101884, pp. 1-8.*
Secor, Ethan B., et al., "Combustion-Assisted Photonic Annealing of Printable Graphene Inks via Exothermic Binders". ACS Appl. Mater. Interfaces 2017, 9, 29418-29423.*
Arapov, Kirill, et al., "Conductivity Enhancement of Binder-Based Graphene Inks by Photonic Annealing and Subsequent Compression Rolling". Advanced Engineering Materials, 2016, 18, No. 7, pp. 1234-1239.*
Korean Office Action dated May 20, 2024 in Application No. 10-2022-0061819.

* cited by examiner

*Primary Examiner* — Bret P Chen
(74) *Attorney, Agent, or Firm* — Sughrue Mion, PLLC

(57) ABSTRACT

A method of manufacturing an ink for photonic annealing includes manufacturing surface-modified metal nanoparticles using a first surface modifier, manufacturing surface-modified metal micron particles using a second surface modifier, and mixing a solution containing the surface-modified metal micron particles with the surface-modified metal nanoparticles to manufacture an ink for photonic annealing in which, in the ink for photonic annealing, the metal nanoparticles are adsorbed on a surface of the micron particles, and the metal nanoparticles are adsorbed in a single layer.

5 Claims, 6 Drawing Sheets

[FIG. 1A]
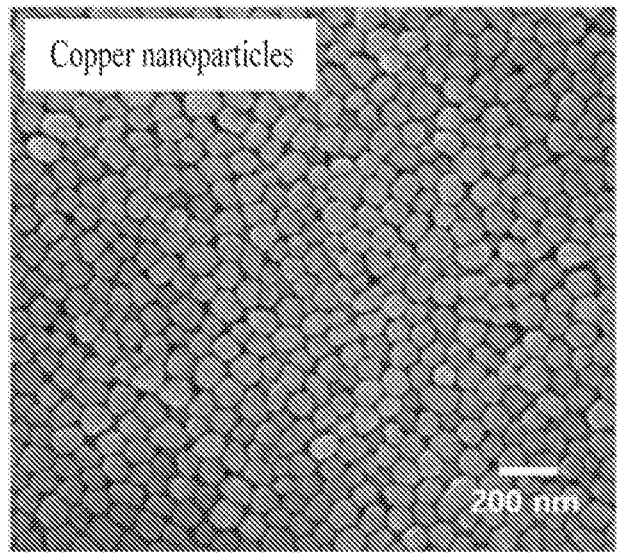
[FIG. 1B]
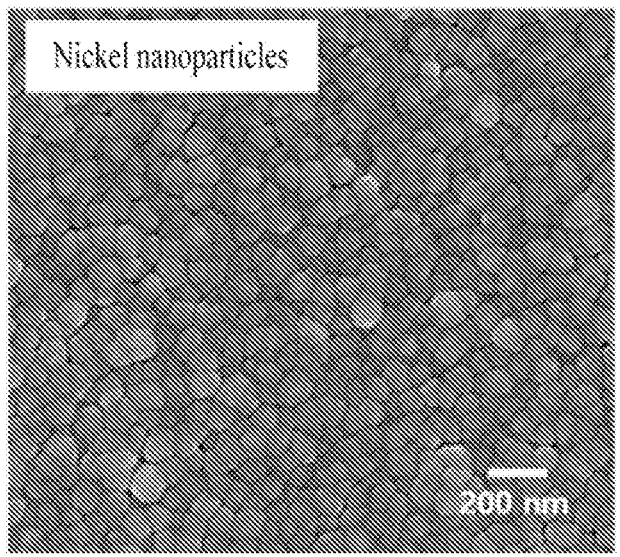

[FIG. 1C]
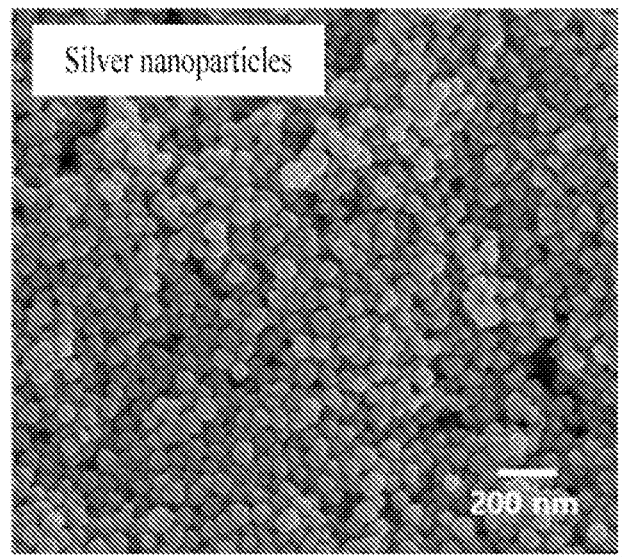
[FIG. 2A]
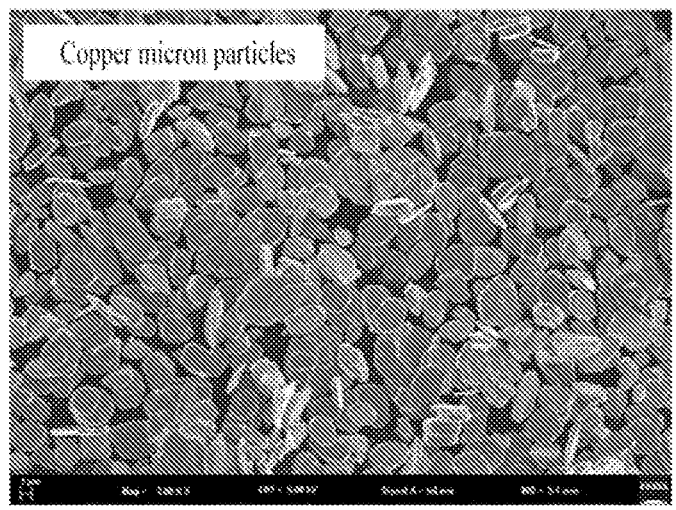

[FIG. 2B]
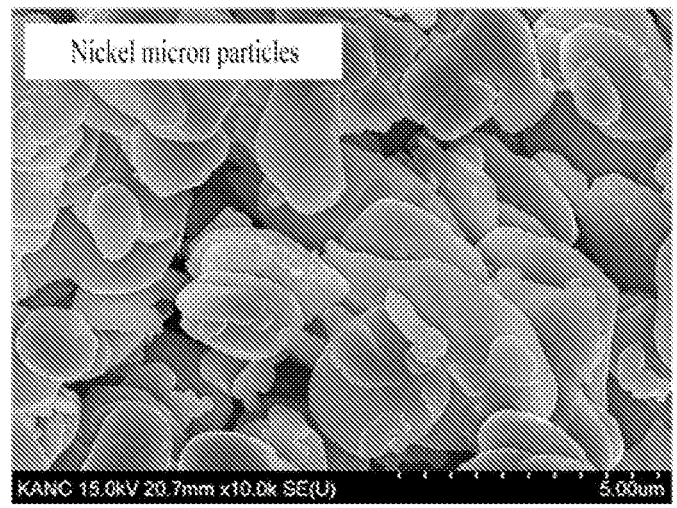
[FIG. 3]
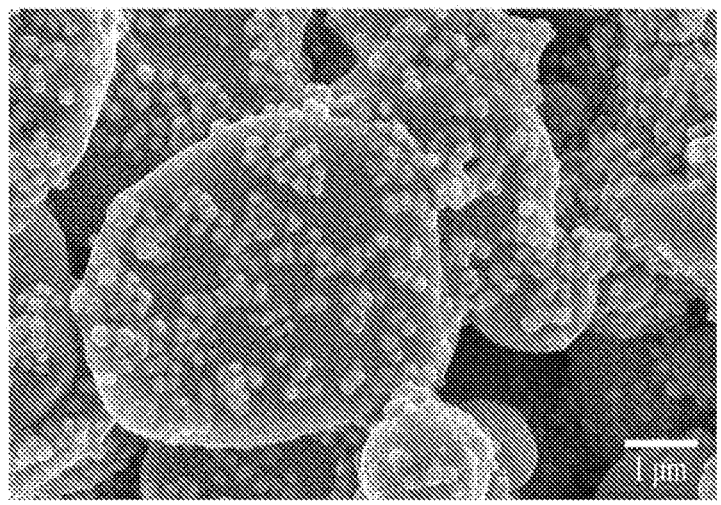

[FIG. 4]
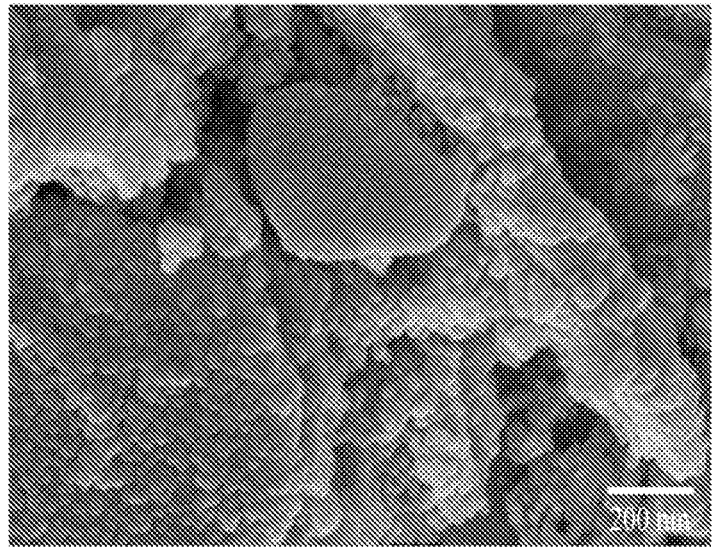
[FIG. 5]
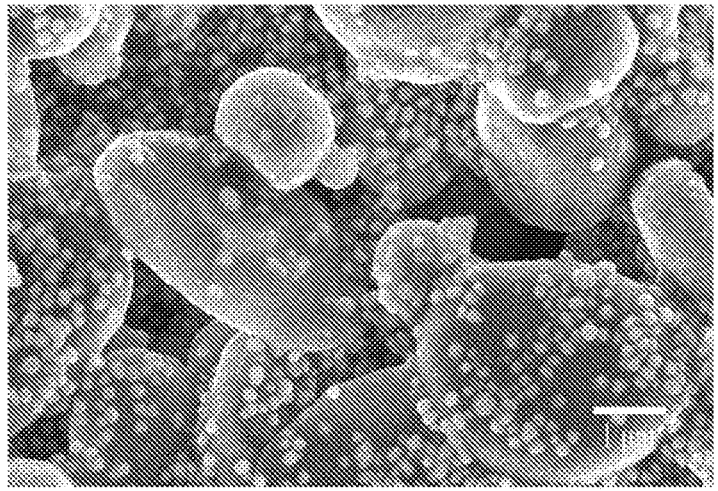

【FIG. 6】
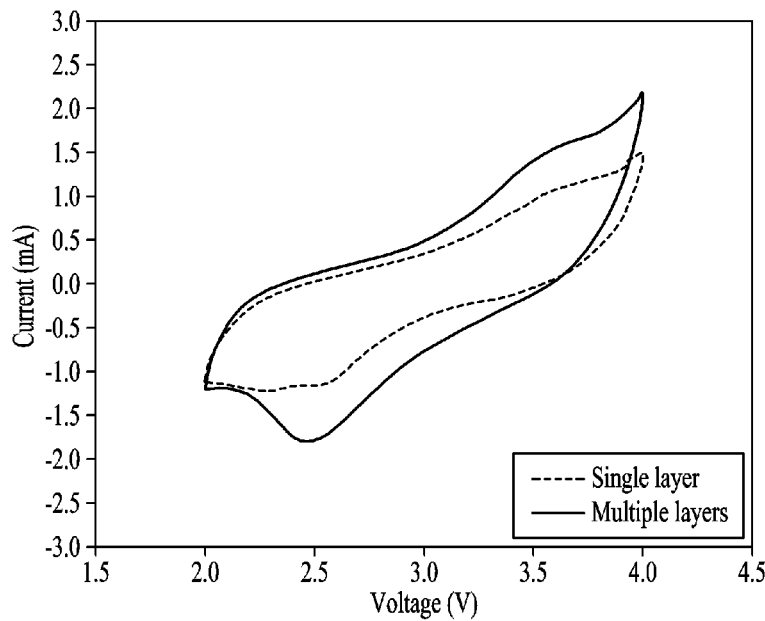
【FIG. 7】
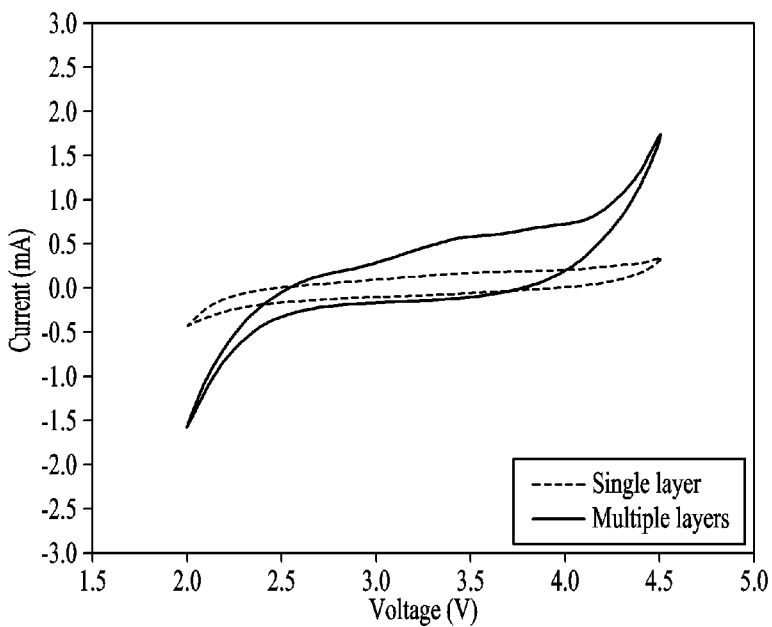

【FIG. 8】
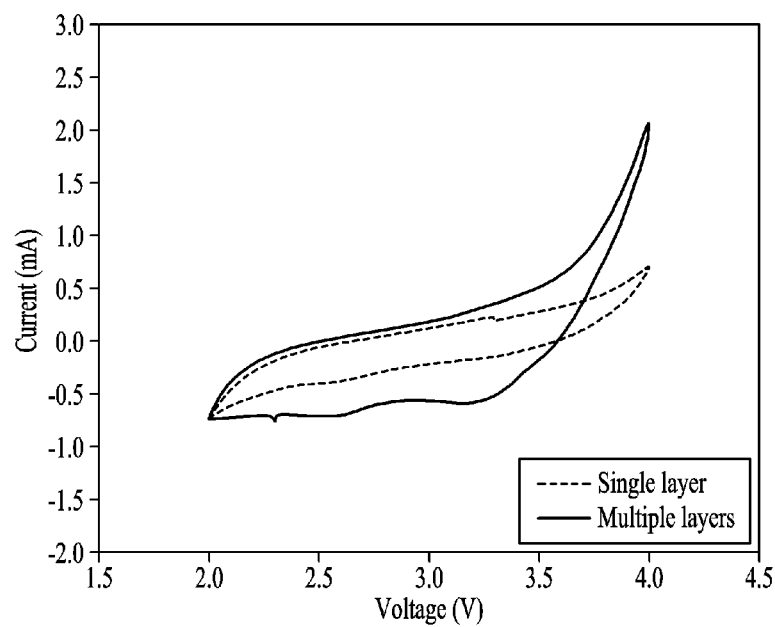

METHOD FOR MANUFACTURING INK FOR PHOTONIC ANNEALING, AND METHOD FOR MANUFACTURING SURFACE-FUNCTIONALIZED METAL FILM

CROSS-REFERENCE TO RELATED APPLICATION

This application claims priority to Korean Patent Application No. 10-2022-0061819, filed on May 20, 2022 in the Korean Intellectual Property Office, the disclosure of which is incorporated herein by reference.

BACKGROUND OF THE DISCLOSURE

Field of the Disclosure

The present disclosure relates to an ink for photonic annealing, a thick metal film surface-functionalized using the ink for photonic annealing, and methods of manufacturing the ink for photonic annealing and the thick metal film.

Description of the Related Art

In the field of printed electronics, inks including micron particles of metals such as silver, copper, aluminum and nickel are mainly used to print metal pattern layers. Therefore, there is a limitation in that only the basic performance of metal micron particles is expressed when manufacturing a patterned metal thick film. The present disclosure proposes a technology capable of imparting functionality to a thick metal film by forming a heterogeneous metal layer and an alloy layer on the thick metal film.

RELATED ART DOCUMENT

Patent Document

Korean Patent Application Publication No. 10-2012-0132111, "Light sintering method of conductive Ag nano ink"

SUMMARY OF THE DISCLOSURE

Therefore, the present disclosure has been made in view of the above problems, and it is an object of the present disclosure to provide an ink for photonic annealing in which single-layer metal nanoparticles are adsorbed on metal micron particles.

It is another object of the present disclosure to induce surface functionalization of a thick metal film printed using an ink for photonic annealing.

In accordance with an aspect of the present disclosure, the above and other objects can be accomplished by the provision of an ink for photonic annealing, including: metal micron particles; and metal nanoparticles adsorbed on a surface of the metal micron particles, wherein the adsorbed metal nanoparticles are formed in a single layer.

In accordance with an embodiment, the adsorption may be formed by physical bonding between the metal micron particles and the metal nanoparticles.

In accordance with an embodiment, the metal nanoparticles may be adsorbed in a ratio of 10% to 90% relative to a total area of the metal micron particles.

In accordance with an embodiment, a diameter of the metal nanoparticles may be 10 nm to 150 nm.

In accordance with an embodiment, a diameter of the metal micron particles may be 0.5 μm to 10 μm.

In accordance with an embodiment, a weight ratio of the metal nanoparticles to metal micron particles may be 10:90 to 90:10.

In accordance with an embodiment, the metal nanoparticles may be made of one selected from gold, silver, copper, nickel, tin, and alloy compositions thereof.

In accordance with an embodiment, the metal micron particles may be made of one selected from gold, platinum, silver, copper, nickel, aluminum, tin, zinc and alloy compositions thereof.

In accordance with another aspect of the present disclosure, there is provided a surface-functionalized thick metal film, including: a substrate; and the ink for photonic annealing according to an embodiment of the present disclosure which is formed on the substrate, wherein the ink for photonic annealing is irradiated with light to form a functional surface layer.

In accordance with an embodiment, an electrical conductivity of the surface-functionalized thick metal film may be 5,000 S/cm to 50,000 S/cm.

In accordance with still another aspect of the present disclosure, there is provided a method of manufacturing an ink for photonic annealing, the method including; manufacturing surface-modified metal nanoparticles using a first surface modifier; manufacturing surface-modified metal micron particles using a second surface modifier; and mixing a solution containing the surface-modified metal micron particles with the surface-modified metal nanoparticles to manufacture an ink for photonic annealing, wherein, in the ink for photonic annealing, the metal nanoparticles are adsorbed on a surface of the micron particles, and the metal nanoparticles are adsorbed in a single layer.

In accordance with an embodiment, the first surface modifier may be one or more selected from the group consisting of organic molecules having a carboxyl group, an amine group, an imine group, a thiol group, a hydroxyl group and a carbonyl group or may be one or more selected from the group consisting of polymers having a carboxyl group, an amine group, an imine group, a thiol group, a hydroxyl group and a carbonyl group.

In accordance with an embodiment, the second surface modifier may be one or more selected from the group consisting of organic molecules having a carboxyl group, an amine group, an imine group, a thiol group, a hydroxyl group and a carbonyl group or may be one or more selected from the group consisting of polymers having a carboxyl group, an amine group, an imine group, a thiol group, a hydroxyl group and a carbonyl group.

In accordance with yet another aspect of the present disclosure, there is provided a method of manufacturing a surface-functionalized thick metal film, the method including: printing the ink for photonic annealing manufactured according to an embodiment of the present disclosure on a substrate; and converting the ink for photonic annealing into a functional surface layer by irradiating the printed photonic annealing ink with light.

In accordance with an embodiment, the light irradiation may be performed under a general atmosphere.

BRIEF DESCRIPTION OF THE DRAWINGS

The above and other objects, features and other advantages of the present disclosure will be more clearly understood from the following detailed description taken in conjunction with the accompanying drawings, in which:

FIG. 1A to FIG. 1C illustrate scanning electron microscope (SEM) images of copper nanoparticles, nickel nanoparticles, and silver nanoparticles respectively manufactured in Preparation Examples 1 to 3;

FIG. 2A and FIG. 2B illustrate scanning electron microscope (SEM) images of copper micron particles and nickel micron particles used in an example;

FIG. 3 illustrates a scanning electron microscope (SEM) image of Example 1-1 (an ink for photonic annealing in which copper nanoparticles are adsorbed in a single layer on copper micron particles) of the present disclosure.

FIG. 4 illustrates a scanning electron microscope (SEM) image of Example 2-1 (an ink for photonic annealing in which nickel nanoparticles are adsorbed in a single layer on nickel micron particles) of the present disclosure.

FIG. 5 illustrates a scanning electron microscope (SEM) image of Example 3-1 (an ink for photonic annealing in which silver nanoparticles are adsorbed in a single layer on copper micron particles) of the present disclosure;

FIGS. 6 to 8 illustrate cyclic voltammetry measurement results of examples and comparative examples of the present disclosure.

DETAILED DESCRIPTION OF THE DISCLOSURE

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context.

It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the disclosure and the appended claims, the singular forms "a", "an" and "the" are intended to include the plural forms as well, unless context clearly indicates otherwise.

In addition, when an element such as a layer, a film, a region, and a constituent is referred to as being "on" another element, the element can be directly on another element or an intervening element can be present.

Hereinafter, embodiments of the present disclosure are described in detail with reference to the accompanying drawings.

An ink for photonic annealing according to an embodiment of the present disclosure includes metal micron particles and metal nanoparticles adsorbed on the surface of the metal micron particles, wherein the adsorbed metal nanoparticles form a single layer.

In the field of printed electronics, inks including micron particles of metals such as silver, copper, aluminum and nickel are mainly used to print metal pattern layers. Therefore, there is a limitation in that only the basic performance of metal micron particles is expressed when manufacturing a patterned metal thick film. The present disclosure proposes a technology capable of imparting functionality to a thick metal film by forming a heterogeneous metal layer and an alloy layer on the thick metal film using metal nanoparticles adsorbed on metal micron particles.

In this specification, "thick film" is used as the meaning of a substrate on which a pattern layer is formed by applying energy after drawing a pattern with ink on a substrate.

As used herein, "metal" in "thick metal film" means that an ink on a substrate is metal, not the material of the substrate. A metal substrate may be used, but the material of the substrate is not limited thereto.

According to an embodiment, adsorption in the ink for photonic annealing may be adsorption due to physical bonding between metal micron particles and metal nanoparticles. As described above, it is an important feature that metal nanoparticles are adsorbed on metal micron particles as a single layer, and to realize this, adsorption was performed using a specific surface modifier.

Metal nanoparticles adsorbed as a single layer on metal micron particles have a very high absorption rate for photons of a specific wavelength. Metal nanoparticles absorb light energy and convert the absorbed light energy into heat energy during a light irradiation process. The converted thermal energy induces a sintering reaction on the surface of the metal micron particles, enabling the production of a thick metal film. In addition, it is possible to impart new functionality to the surface of a thick metal film by inducing fusion and alloying reactions of heterogeneous metal materials on the surface of metal micron particles.

According to an embodiment, to maximize the contact area between metal micron particles and metal nanoparticles, the metal nanoparticles may be formed in a single layer. Here, the metal nanoparticles may be contacted in a ratio of 10% to 90% of the total area of the metal micron particles.

When the adsorption layer of the metal nanoparticles is formed in multiple layers, there is a limitation in that the generated thermal energy cannot be directly transferred to the surface of the metal micron particles. In addition, when the metal nanoparticles are not adsorbed and simply mixed, heat generated by the metal nanoparticles cannot be transferred to the metal micron particles, so there is a limit in that heat loss occurs.

According to an embodiment, the diameter of the metal nanoparticles may be 10 nm to 150 nm. Preferably, the metal nanoparticles may have a diameter of 20 nm to 100 nm.

According to an embodiment, the diameter of the metal micron particles may be 0.5 μm to 10 μm. Preferably, the metal micron particles may have a diameter of 1 μm to 5 μm.

When the metal nanoparticles have a diameter within the above ranges, the metal nanoparticles may absorb photons when light-irradiated after printing an ink for photonic annealing including the metal nanoparticles and the metal micron particles on a substrate.

When the size of the metal micron particles exceeds the above range, the volume fraction of the metal nanoparticles is relatively reduced, and thus the ratio of photons absorbed by the metal nanoparticles may decrease. Therefore, when the sizes of the metal nanoparticles and the metal micron particle exceeds the above ranges, the efficiency of the fusion and alloying reaction on the surface of the metal micron particles is rapidly reduced because the metal nanoparticles cannot sufficiently absorb light energy.

When the size of the metal micron particles is less than the above range, there is a problem in that the metal nanoparticles cannot be adsorbed to the surface of the metal micron particles while having a sufficient mass per unit area.

According to an embodiment, a weight ratio of the metal nanoparticles and the metal micron particles included in the ink for photonic annealing may be 10:90 to 90:10.

When a ratio of the metal nanoparticles based on the weight of the metal micron particles is less than the above range, the relative volume fraction of the metal nanoparticles decreases so that sufficient light energy cannot be absorbed, and as a result, the generation of thermal energy is insufficient, limiting the formation of a functional layer.

When a ratio of the metal nanoparticles based on the weight of the metal micron particles exceeds the above range, a rapid volumetric contraction occurs due to the connection of the metal nanoparticles so that cracks are generated.

According to an embodiment, the metal nanoparticles may be made of one selected from gold, silver, copper, nickel, tin, and alloy compositions thereof.

According to an embodiment, the metal micron particles may be made of one selected from gold, platinum, silver, copper, nickel, aluminum, tin, and alloy compositions thereof.

In addition, the present disclosure relates to a surface-functionalized thick metal film.

A surface-functionalized thick metal film according to another embodiment of the present disclosure includes a substrate and the above-described photonic annealing ink to be formed on the substrate, wherein the ink for photonic annealing is irradiated with light to form a functional surface layer.

In the present disclosure, the expression "surface-functionalized" means that a surface film having electrical conductivity or electrochemical stability has been formed.

When heat is directly applied to the transition metal nanoparticles during a annealing process, transition metal nanoparticles are oxidized during heat treatment, resulting in loss of the characteristics of the metal material. Accordingly, to solve this problem, an inert atmosphere should be created during heat treatment. On the other hand, in the case of photonic annealing, very short light irradiation of around 1 msec shows an effect similar to that of heat treatment, so the process may be performed without worrying about the oxidation of a transition metal even under normal atmospheric conditions.

According to an embodiment, the surface-functionalized thick metal film may have an electrical conductivity of 5,000 S/cm to 50,000 S/cm. When the metal nanoparticles are not adsorbed to metal micron particles, i.e., in the case of an ink in which metal nanoparticles and metal micron particles are simply mixed, an electrical conductivity after light irradiation is limited to 20,000 S/cm or less. This is because the thermal energy generated by the metal nanoparticles cannot be directly transmitted to the metal micron particles so that a conductive functional layer cannot be generated.

In addition, the present disclosure relates to a method of manufacturing an ink for photonic annealing.

The method of manufacturing an ink for photonic annealing according to an embodiment of the present disclosure includes a step of manufacturing surface-modified metal nanoparticles using a first surface modifier, a step of manufacturing surface-modified metal micron particles using a second surface modifier, and a step of mixing a solution containing surface-modified metal micron particles with surface-modified metal nanoparticles to prepare an ink for photonic annealing, wherein, in the ink for photonic annealing, the metal nanoparticles are adsorbed on the surface of the micron particles and the metal nanoparticles are adsorbed in the form of a single layer.

The first surface modifier and the second surface modifier refer to organic molecules or polymers including functional groups capable of bonding with metals. That is, the first surface modifier is added to synthesize metal nanoparticles having the first surface modifier bonded on the surface thereof, and the surface-modified metal micron particles are mixed with the surface-modified metal nanoparticles after combining the second surface modifier with the metal micron particles to physically bond the metal nanoparticles and the metal micron particles to each other. Here, single-layer adsorption of the metal nanoparticles occurs through a reaction between the two particle surfaces.

Meanwhile, when a surface modifier is not used, metal nanoparticles are deposited along an interface formed when a solvent in the printed photonic annealing ink dries, resulting in the local formation of multi-layered metal nanoparticles on the surface of the metal micron particles. However, when a surface modifier is used, the bonding force between metal micron particles and metal nanoparticles is induced, which inhibits the flow of metal nanoparticles that occurs when a solvent is dried, so that multi-layered particles are not formed.

According to an embodiment, the first surface modifier may be one or more selected from the group consisting of organic molecules having carboxyl, amine, imine, a thiol group, hydroxyl and carbonyl functional groups, or may be one or more selected from the group consisting of polymers having carboxyl, amine, imine, a thiol group, hydroxyl and carbonyl functional groups.

More specifically, the first surface modifier may be one selected from an organic molecule group consisting of citric acid (CA), aminobenzoic acid, amino cyclohexane carboxylic acid, aminobutyric acid, ethylene-diamine-tetra acetic acid, 4-mercaptobenzoic acid, benzene-1,4-dithiol, ethylenediamine, diethylenetriamine and acetylacetone, but is not limited thereto.

In addition, the first surface modifier may be one selected from a polymer group consisting of polyethyleneimine, polyallyamine, polyacrylic acid, polypropylene glycol, polyethylene glycol, poly (ethylene glycol)methyl ether thiol, ethylacetoacetate and polyvinylpyrrolidone (PVP), but is not limited thereto.

According to an embodiment, the second surface modifier may be one or more selected from the group consisting of organic molecules having carboxyl, amine, imine, a thiol group, hydroxyl and carbonyl functional groups, or may be one or more selected from the group consisting of polymers having carboxyl, amine, imine, a thiol group, hydroxyl and carbonyl functional groups.

More specifically, the second surface modifier may be one selected from an organic molecule group consisting of citric acid (CA), aminobenzoic acid, amino cyclohexane carboxylic acid, aminobutyric acid, ethylene-diamine-tetra acetic acid, 4-mercaptobenzoic acid, benzene-1,4-dithiol, ethylenediamine, diethylenetriamine and acetylacetone, but is not limited thereto.

In addition, the second surface modifier may be one selected from a polymer group consisting of polyethyleneimine, polyallyamine, polyacrylic acid, polypropylene glycol, polyethylene glycol, poly (ethylene glycol)methyl ether thiol, ethylacetoacetate and polyvinylpyrrolidone (PVP), but is not limited thereto.

The second surface modifier may be formed of the same material as the first surface modifier or a different material therefrom.

In addition, the present disclosure relates to a method of manufacturing a surface-functionalized thick metal film.

The method of manufacturing a surface-functionalized thick metal film according to the present disclosure includes a step of printing an ink for photonic annealing on a substrate and a step of photo-irradiating the printed photonic annealing ink to convert the ink for photonic annealing into a functional surface layer.

When the printed photonic annealing ink is irradiated with light by a photonic annealing process such as a laser process, a sintering reaction occurs along the printed photonic annealing ink on the surface of the substrate. That is, the metal nanoparticles of the ink for photonic annealing absorb light energy, and the absorbed light energy is converted into heat energy, so that heat treatment effect appears. Here, for the surface reaction between the metal nanoparticles and the metal micron particles, as many interfaces as possible should be formed. This is the reason why the metal nanoparticles should be adsorbed in a single layer when adsorbed on the surface of the metal micron particles. If the metal nanoparticles are in the form of agglomerates, thermal energy does not reach the metal micron particles when light energy is converted into thermal energy during light irradiation, which is undesirable because the ink for photonic annealing cannot be surface-functionalized.

According to an embodiment, the light irradiation process may be performed under a general atmosphere other than an inert atmosphere. The general atmosphere means that an oxygen content is 21 v/v % and a pressure is 1 atm.

When light treatment is performed on metal nanoparticles, light energy is converted into heat energy, thereby exhibiting the same effect as heat treatment. However, unlike heat irradiation for 30 minutes or more to show the same effect, light irradiation may be performed only for a short time as in the above range. There is a problem that surface functionalization does not sufficiently occur when heat, not light, is irradiated for 0.5 to 50 msec under normal atmospheric conditions. Therefore, thermal sintering is performed under an inert gas condition to prevent the metal nanoparticles from being oxidized and losing desired properties, such as electrical conductivity, of the metal material due to the application of thermal energy for a relatively long time during heat treatment. However, during photonic annealing, metal nanoparticles are not oxidized even if the process is performed under normal atmospheric conditions because light energy is irradiated to metal nanoparticles only for a short time of 0.5 msec to 50 msec. Preferably, the photonic annealing process is performed for 1 msec to 30 msec. When photonic annealing is performed for a short time below the above range, the surface functionalization of the thick film may not sufficiently occur. On the other hand, when photonic annealing is performed for a long time beyond the above range, the metal of the ink for photonic annealing may be oxidized and electrical conductivity may be lost.

According to an embodiment, in the light irradiation step, white light may be used as a light source. When white light is used as a light source, light irradiation is performed for a short time of 0.5 msec to 30 msec under a light energy density condition of 0.1 J/cm$^2$ to 20 J/cm$^2$ to manufacture a surface-functionalized thick metal film.

According to an embodiment, a visible light or infrared wavelength laser may be used as a light source in the light irradiation step. When a laser is used as a light source, a surface-functionalized thick metal film may be manufactured by processing at a scan rate of 50 mm/sec to 2,000 mm/sec under a power condition of 0.5 W to 15 W. A sample having a length of 100 mm may be photonic annealed for a short time of 50 msec by irradiating a laser at a scanning speed of 2,000 mm/sec. The width of a sample is determined by the area of a laser beam. When the heat treatment is performed for a short time of 0.5 msec or less, sufficient light energy is not injected, so the photonic annealing is not completed.

Hereinafter, a nano-micro composite ink and a thick metal film formed using the nano-micro composite ink are described. According to another embodiment of the present disclosure, a nano-micro composite ink may be prepared, and a thick metal film may be manufactured using the nano-micro composite ink.

When an ink prepared using metal micron particles such as silver, copper, aluminum and nickel is used to print a metal pattern layer, a manufactured thick metal film exhibits only the basic performance of metal micron particles. Accordingly, the present disclosure presents a technique for a thick metal film to which functionality is imparted by forming a heterogeneous metal and alloy layer composed of metal micron particles and metal nanoparticles on a substrate using a nano-micro composite ink.

The nano-micro composite ink according to the present disclosure includes metal micron particles and metal nanoparticles. Here, the diameter of the metal nanoparticles may be 10 nm to 150 nm, and the diameter of the metal micron particles may be 0.5 μm to 10 μm.

The metal nanoparticles may be one selected from gold, silver, copper, nickel, tin, and alloy compositions thereof.

In the nano-micro composite ink, the metal nanoparticles may be made in a paste form, and the metal micron particles may be made in a flake form.

The substrate on which the metal pattern layer is created may be one selected from polyimide (PI), polyethylene terephthalate (PET), polyethylene naphthalate (PEN), polyestersulfone (PES), glass, metals (copper, aluminum, nickel) and ceramics (Al$_2$O$_3$, ZrO$_2$).

The thick film formed using the nano-micro composite ink according to the present disclosure has a metal pattern layer or is coated with a metal.

A mixture of surface-modified metal micron particles, surface-modified metal nanoparticles and a solvent is stirred to prepare a nano-micro composite ink, and after printing the prepared composite ink on a substrate, the ink is dried at a temperature at which the solvent can volatilize, thereby manufacturing a metal pattern layer.

In addition, the composite ink may be coated on a substrate and dried at a high temperature to manufacture a thick film in the form of a metal-coated film.

Hereinafter, the present disclosure is described in more detail through examples. These examples are intended to explain the present disclosure in more detail, and the scope of the present disclosure is not limited to these examples.

[Preparation Example 1] Copper Nanoparticle Solution 12 g of polyvinylpyrrolidone (PVP) with a molecular weight of 58,000 was added to 280 mL of diethyleneglycol and dissolved by stirring at 90° C. for 30 minutes. The stirred solution was cooled to room temperature, and 2.35 g of sodium phosphinate monohydrate (NaH$_2$PO$_2$—H$_2$O) was added thereto, followed by heating to 130° C. while stirring. 7 g of CuSO$_4$ was added to the mixture, and then reaction was allowed to occur by stirring at 130° C. for one hour, followed by cooling to room temperature. A precipitate was obtained by centrifugation at 7000 rpm for 15 minutes.

The precipitate was copper nanoparticles with an average particle size of 90 nm. A copper nanoparticle solution was prepared by mixing 0.5 g of the copper nanoparticles with 2 g of ethanol.

[Preparation Example 2] Nickel Nanoparticle Solution 12 g of polyvinylpyrrolidone (PVP) with a molecular weight of 58,000 was added to 280 mL of ethyleneglycol and stirred at 90° C. for 30 minutes. The stirred solution was cooled to room temperature, and 6.65 g of nickel chloride hexahydrate and 5.6 g of sodium borohydride (NaBH$_4$) were added thereto, followed by heating to 150° C. while stirring. After reacting for 1 hour, the mixture was cooled to room temperature. A precipitate was obtained by centrifugation at 7000 rpm for 15 minutes.

The precipitate is nickel nanoparticles with an average particle size of 20 nm. A copper nanoparticle solution was prepared by mixing 0.5 g of the nickel nanoparticles with 2 g of ethanol.

[Preparation Example 3] Silver Nanoparticle Solution 4.13 g of polyvinylpyrrolidone (PVP) with a molecular weight of 10,000, which serves as a reducing agent, was added to 150 mL of ethylene glycol, followed by dissolving by stirring at 80° C. The stirred solution was cooled to room temperature, and 6.43 g of Ag nitrate was added thereto. After reacting at 120° C. for one hour, the mixture was cooled to room temperature. A precipitate was obtained by centrifugation at 7000 rpm for 15 minutes.

The precipitate is silver nanoparticles with an average particle size of 60 nm. A silver nanoparticle solution was prepared by mixing 0.5 g of the silver nanoparticles with 2 g of ethanol.

[Example 1-1] Photonic Annealing Ink in which Copper Nanoparticles are Adsorbed in Single Layer on Copper Micron Particles A citric acid solution was prepared by adding 0.3 g of citric acid to 9.7 g of ethanol. 2.0 g of copper micron particles with a particle size of 3 μm were added to the citric acid solution and stirred for 30 minutes. Next, a copper micron particle precipitate to which citric acid was attached was obtained by centrifuging at 7000 rpm for 15 minutes.

The copper micron particles were added to and mixed with Preparation Example 1 (copper nanoparticle solution), thereby preparing an ink for photonic annealing in which copper nanoparticles were adsorbed in a single layer on copper micron particles. The copper nanoparticles were adsorbed in a ratio of 33% of the total area of copper micron particles.

[Example 1-2] Thick Metal Film Surface-Functionalized by Irradiating Photonic Annealing Ink, in which Copper Nanoparticles are Adsorbed in Single Layer on Copper Micron Particles, with Laser Light Example 1-1 (an ink for photonic annealing in which copper nanoparticles are adsorbed in a single layer on copper micron particles) was printed on a polyimide substrate. A laser light was irradiated along a pattern of the printed photonic annealing ink for a short time of 25 msec at a speed of 400 mm/sec under normal atmospheric conditions to obtain a thick metal film having a functional surface layer formed thereon.

[Example 2-1] Photonic Annealing Ink in which Nickel Nanoparticles are Adsorbed in Single Layer on Nickel Micron Particles A citric acid solution was prepared by adding 0.3 g of citric acid to 9.7 g of ethanol. 2.0 g of nickel micron particles with a particle size of 3 μm were added to the citric acid solution and stirred for 30 minutes. Next, a nickel micron particle precipitate to which citric acid was attached was obtained by centrifuging at 7000 rpm for 15 minutes.

The nickel micron particles were added to and mixed with Preparation Example 2 (nickel nanoparticle solution), thereby preparing an ink for photonic annealing in which nickel nanoparticles were adsorbed in a single layer on nickel micron particles. The nickel nanoparticles were adsorbed in a ratio of 39% of the total area of nickel micron particles.

[Example 2-2] Thick Metal Film Surface-Functionalized by Irradiating Photonic Annealing Ink, in which Nickel Nanoparticles are Adsorbed in Single Layer on Nickel Micron Particles, with Laser Light Example 2-1 (an ink for photonic annealing in which nickel nanoparticles are adsorbed in a single layer on nickel micron particles) was printed on a polyimide substrate. A laser light was irradiated along a pattern of the printed photonic annealing ink for a short time of 10 msec at a speed of 1,000 mm/sec under normal atmospheric conditions to obtain a thick metal film having a functional surface layer formed thereon.

[Example 3-1] Photonic Annealing Ink in which Silver Nanoparticles are Adsorbed in Single Layer on Copper Micron Particles A citric acid solution was prepared by adding 0.3 g of citric acid to 9.7 g of ethanol. 2.0 g of copper micron particles with a particle size of 3 μm were added to the citric acid solution and stirred for 30 minutes. Next, a copper micron particle precipitate to which citric acid was attached was obtained by centrifuging at 7000 rpm for 15 minutes.

The copper micron particles were added to and mixed with Preparation Example 3 (silver nanoparticle solution), thereby preparing an ink for photonic annealing in which silver nanoparticles were adsorbed in a single layer on copper micron particles. The silver nanoparticles were adsorbed in a ratio of 19% of the total area of copper micron particles.

[Example 3-2] Thick Metal Film Surface-Functionalized by Irradiating Photonic Annealing Ink, in which Silver Nanoparticles are Adsorbed in Single Layer on Copper Micron Particles, with Laser Light Example 3-1 (an ink for photonic annealing in which silver nanoparticles are adsorbed in a single layer on copper micron particles) was printed on a polyimide substrate. A laser light was irradiated along a pattern of the printed photonic annealing ink for a short time of 25 msec at a speed of 400 mm/sec under normal atmospheric conditions to obtain a thick metal film having a functional surface layer formed thereon.

[Comparative Example 1-1] Photonic Annealing Ink in which Copper Nanoparticles are Adsorbed in Multiple Layers on Copper Micron Particles 2 g of copper micron particles with a particle size of 3 μm was added to Preparation Example 1 (copper nanoparticle solution) and mixed, thereby preparing an ink for photonic annealing in which copper nanoparticles are adsorbed in multiple layers on copper micron particles.

[Comparative Example 1-2] Thick Metal Film Obtained by Irradiating Photonic Annealing Ink, in which Copper Nanoparticles are Adsorbed in Multiple Layers on Copper Micron Particles, with Laser Light Comparative Example 1-1 (an ink for photonic annealing in which copper nanoparticles are adsorbed in multiple layers on copper micron particles) was printed on a polyimide substrate. A laser light was irradiated along a pattern of the printed photonic annealing ink for a short time of 25 msec at a speed of 400 mm/sec under normal atmospheric conditions to obtain a thick metal film.

[Comparative Example 1-3] Thick Metal Film Obtained by Heat-Treating Photonic Annealing Ink in which Copper Nanoparticles are Adsorbed in Single Layer on Copper Micron Particles Example 1-1 (an ink for photonic annealing in which copper nanoparticles are adsorbed in a single layer on copper micron particles) was printed on a glass substrate. The printed glass substrate was heat-treated at 300° C. for 2 hours under normal atmospheric conditions to manufacture a thick film.

[Comparative Example 2-1] Photonic Annealing Ink in which Nickel Nanoparticles are Adsorbed in Multiple Layers on Nickel Micron Particles 2 g of nickel micron particles with a particle size of 3 μm was added to Preparation Example 2 (nickel nanoparticle solution) and mixed, thereby preparing an ink for photonic annealing in which nickel nanoparticles are adsorbed in multiple layers on nickel micron particles.

[Comparative Example 2-2] Thick Metal Film Obtained by Irradiating Photonic Annealing Ink, in which Nickel Nanoparticles are Adsorbed in Multiple Layers on Nickel Micron Particles, with Laser Light Comparative Example 2-1 (an ink for photonic annealing in which nickel nanoparticles are adsorbed in multiple layers on nickel micron particles) was printed on a polyimide substrate. A laser light was irradiated along a pattern of the printed photonic annealing ink for a short time of 10 msec at a speed of 1000 mm/sec under normal atmospheric conditions to obtain a thick metal film.

[Comparative Example 2-3] Thick Metal Film Obtained by Heat-Treating Photonic Annealing Ink in which Nickel Nanoparticles are Adsorbed in Single Layer on Nickel Micron Particles Example 2-1 (an ink for photonic annealing in which nickel nanoparticles are adsorbed in a single layer on nickel micron particles) was printed on a glass substrate. The printed glass substrate was heat-treated at 350° C. for 2 hours under normal atmospheric conditions to manufacture a thick film.

[Comparative Example 3-1] Photonic Annealing Ink in which Silver Nanoparticles are Adsorbed in Multiple Layers on Copper Micron Particles 2 g of copper micron particles with a particle size of 3 μm was added to Preparation Example 3 (silver nanoparticle solution) and mixed, thereby preparing an ink for photonic annealing in which silver nanoparticles are adsorbed in multiple layers on copper micron particles.

[Comparative Example 3-2] Thick Metal Film Obtained by Irradiating Photonic Annealing Ink, in which Silver Nanoparticles are Adsorbed in Multiple Layers on Copper Micron Particles, with Laser Light Comparative Example 3-1 (an ink for photonic annealing in which silver nanoparticles are adsorbed in multiple layers on copper micron particles) was printed on a polyimide substrate. A laser light was irradiated along a pattern of the printed photonic annealing ink for a short time of 25 msec at a speed of 400 mm/sec under normal atmospheric conditions to obtain a thick metal film.

The preparation examples, the examples and the comparative examples were summarized in the following table.

TABLE 1

| | Nanoparticle type | Micron particle type | Adsorption type | Annealing method | Resistivity (μΩ · cm) | Current (mA) |
|---|---|---|---|---|---|---|
| Preparation Example 1 (nanoparticles) | Copper | — | — | — | — | — |
| Preparation Example 2 (nanoparticles) | Nickel | — | — | — | — | — |
| Preparation Example 3 (nanoparticles) | Silver | — | — | — | — | — |
| Example 1-1 (ink) | Copper | Copper | Single layer | — | — | — |

TABLE 1-continued

| | Nanoparticle type | Micron particle type | Adsorption type | Annealing method | Resistivity ($\mu\Omega \cdot cm$) | Current (mA) |
|---|---|---|---|---|---|---|
| Example 1-2 (thick film) | | | | Light | 32.4 | 0.348 |
| Example 2-1 (ink) | Nickel | Nickel | Single layer | — | — | — |
| Example 2-2 (thick film) | | | | Light | 199.6 | 0.092 |
| Example 3-1 (ink) | Silver | Copper | Single layer | — | — | — |
| Example 3-2 (thick film) | | | | Light | 21.8 | 0.123 |
| Comparative Example 1-1 (ink) | Copper | Copper | Multiple layers | — | — | — |
| Comparative Example 1-2 (thick film) | | | | Light | 80.3 | 0.484 |
| Comparative Example 1-3 (thick film) | | | Single layer | Heat | Not measured | Not measured |
| Comparative Example 2-1 (ink) | Nickel | Nickel | Multiple layers | — | — | — |
| Comparative Example 2-2 (thick film) | | | | Light | 499.1 | 0.299 |
| Comparative Example 2-3 (thick film) | | | Single layer | Heat | Not measured | Not measured |
| Comparative Example 3-1 (ink) | Silver | Copper | Multiple layers | — | — | — |
| Comparative Example 3-2 (thick film) | | | | Light | 62.2 | 0.189 |

FIG. 3 illustrates a scanning electron microscope (SEM) image of Example 1-1 (an ink for photonic annealing in which copper nanoparticles were adsorbed in a single layer on copper micron particles) of the present disclosure.

FIG. 4 illustrates a scanning electron microscope (SEM) image of Example 2-1 (an ink for photonic annealing in which nickel nanoparticles were adsorbed in a single layer on nickel micron particles) of the present disclosure.

FIG. 5 illustrates a scanning electron microscope (SEM) image of Example 3-1 (an ink for photonic annealing in which silver nanoparticles were adsorbed in a single layer on copper micron particles) of the present disclosure.

Referring to FIGS. 3 to 5, it can be confirmed that metal nanoparticles are adsorbed in a single layer on metal micron particles. This is because the metal nanoparticles and metal micron particles were surface-modified with polyvinylpyrrolidone (PVP) and citric acid, respectively, and physical bonding was induced through the surface reaction therebetween, so that the metal nanoparticles were adsorbed in a single layer.

When a surface modifier is not used, metal nanoparticles are deposited along the interface formed as a solvent of the printed photonic annealing ink dries, and as a result, multi-layered metal nanoparticles are locally formed on the surface of the metal micron particles. However, when a surface modifier is used, the bonding force between metal micron particles and metal nanoparticles is induced, which suppresses the flow of metal nanoparticles that occurs when a solvent dries, so that multi-layered particles are not formed.

Property Evaluation 1. Measurement of Resistivity of Thick Metal Film (Compared to Multi-Layer Adsorption)

A copper wire (Nilaco, 2 mm) was connected using silver epoxy (CW2400), and the resistivity of a metal thick film was measured with a source meter (2450 source meter, Keithley). This was performed to compare the electrical conductivity of the example in which metal nanoparticles were adsorbed in a single layer and the comparative example in which metal nanoparticles were adsorbed in multiple layers. Results are shown in Table 1.

As results of the measurement, the resistivities of Example 1-2 (single layer) and Comparative Example 1-2 (multiple layers) were 32.4$\mu\Omega$·cm and 80.3 $\mu\Omega$·cm, respectively, the resistivities of Example 2-2 (single layer) and Comparative Example 2-2 (multiple layers) were 199.6 $\mu\Omega$·cm and 499.1 $\mu\Omega$·cm, respectively, and the resistivities of Example 3-2 (single layer) and Comparative Example 3-2 were 21.8 $\mu\Omega$·cm and 62.2 $\mu\Omega$·cm, respectively. From these results, it can be confirmed that, when the metal nanoparticles adsorb the metal micron particles as a single layer, the resistivity decreases and, accordingly, the electrical conductivity increases.

Metal nanoparticles absorb the energy of photons and convert it into thermal energy during photonic annealing, which causes a sintering reaction on the surface of the metal micron particles to impart electrical conductivity to an ink for photonic annealing. When metal nanoparticles are adsorbed in a single layer on metal micron particles, the thermal energy generated by the nanoparticles can be transferred to the metal micron particles without loss. However, when metal nanoparticles adsorb in multiple layers, it is difficult for the converted thermal energy to be transferred to the metal micron particles.

Property Evaluation 2. Measurement of Cyclic Voltammetry of Thick Metal Film (Compared to Multi-Layer Adsorption)

A thick metal film, a separator, lithium metal, a spacer disk, a spring, and a cap were sequentially placed in a case of a coin cell, and then a cell was manufactured using a crimper. Cyclic voltammetry (CV) was measured in a range of 2.0 to 4.0 V or 2.0 to 4.5 V at a scan rate of 50 mV s$^{-1}$ using a battery circulation system (WBCS3000L, WonATech) equipment. This was performed to compare the electrochemical stability through current comparison of the example in which metal nanoparticles were adsorbed in a single layer and the comparative example in which metal nanoparticles were adsorbed in multiple layers. FIG. 6 illustrates a voltage-dependent current graph of Example 1-2 (single layer) and Comparative Example 1-2 (multiple layers), FIG. 7 illustrates a voltage-dependent current graph of Example 2-2 (single layer) and Comparative Example 2-2 (multiple layers), and FIG. 8 illustrates a voltage-dependent current graph of Example 3-2 (single layer) and Comparative Example 3-2 (multiple layers).

Referring to Table 1, the current values of Example 1-2 (single layer) and Comparative Example 1-2 (multiple layers) are 0.348 mA and 0.484 mA, respectively, the current values of Example 2-2 (single layer) and Comparative Example 2-2 (multiple layers) are 0.092 mA and 0.299 mA, respectively, and the current values of Example 3-2 (single layer) and Comparative Example 3-2 (multiple layers) are 0.123 mA and 0.189 mA, respectively. From these results, it can be confirmed that, when metal nanoparticles adsorb metal micron particles as a single layer, cyclic voltammetry (CV) decreases and, accordingly, electrochemical stability increases.

To improve the electrochemical stability of a thick metal film, it is necessary to form a carbon protective layer through the carbonization reaction of organic molecules and polymers. When metal nanoparticles are adsorbed in a single layer on metal micron particles, the thermal energy generated by the nanoparticles can be transferred to the metal micron particles without loss. Therefore, a sufficient carbonization reaction can be completed along with a sintering reaction on the surface of the metal micron particles to form a surface protective layer. However, when the metal nanoparticles are adsorbed in multiple layers, it is difficult for converted thermal energy to be transferred to the metal micron particles, so sufficient carbonization reaction cannot be completed. Therefore, when the metal nanoparticles are adsorbed in a single layer, a low current value can be confirmed from the result obtained through cyclic voltammetry.

Property Evaluation 3. Measurement of Resistivity of Thick Metal Film (Compared to Thermal Annealing Process)

A copper wire (Nilaco, 2 mm) was connected using silver epoxy (CW2400), and the resistivity of a metal thick film was measured with a source meter (2450 source meter, Keithley). This was performed to compare the electrical conductivity of the example in which the metal pattern was irradiated with light and the comparative example in which the metal pattern was heat-treated. Results are shown in Table 1.

In Comparative Example 1-3 (thermal annealing) and Comparative Example 2-3 (thermal annealing), resistivity was not measured. From this, it can be seen that the metal nanoparticles were oxidized and the electrical conductivity thereof was lost during heat treatment in a general atmosphere.

Property Evaluation 4. Measurement of Cyclic Voltammetry of Thick Metal Film (Compared to Thermal Annealing Process)

To compare the electrical conductivity of the example in which the metal pattern was irradiated with light and the comparative example in which the metal pattern was heat-treated, an attempt was made to fabricate a cell as in Property Evaluation 2, but the metal thick film was changed to a thick film containing oxide, and cell evaluation was impossible due to side reactions caused by the oxide.

According to an embodiment of the present disclosure, an ink for photonic annealing that is adsorbed in a single layer on metal micron particles and exhibits a heat treatment effect through a surface reaction during photonic annealing can be provided.

According to another embodiment of the present disclosure, a surface-functionalized thick metal film can be provided through processes of printing an ink for photonic annealing on a substrate and photonic annealing the ink for photonic annealing.

Although the present disclosure has been described through limited examples and figures, the present disclosure is not intended to be limited to the examples. Those skilled in the art will appreciate that various modifications, additions and substitutions are possible, without departing from the scope and spirit of the disclosure. Therefore, it should be understood that there is no intent to limit the disclosure to the examples disclosed, rather, the disclosure is to cover all modifications, equivalents, and alternatives falling within the spirit and scope of the disclosure as defined by the claims.

What is claimed is:

1. A method of manufacturing an ink for photonic annealing, the method comprising;
   manufacturing surface-modified metal nanoparticles using a first surface modifier;
   manufacturing surface-modified metal micron particles using a second surface modifier; and
   mixing a solution containing the surface-modified metal micron particles with the surface-modified metal nanoparticles to manufacture an ink for photonic annealing,
   wherein, in the ink for photonic annealing, the metal nanoparticles are adsorbed on a surface of the micron particles, and
   the metal nanoparticles are adsorbed in a single layer.

2. The method according to claim 1, wherein the first surface modifier is one or more selected from the group consisting of organic molecules having a carboxyl group, an amine group, an imine group, a thiol group, a hydroxyl group and a carbonyl group or is one or more selected from the group consisting of polymers having a carboxyl group, an amine group, an imine group, a thiol group, a hydroxyl group and a carbonyl group.

3. The method according to claim 1, wherein the second surface modifier is one or more selected from the group consisting of organic molecules having a carboxyl group, an amine group, an imine group, a thiol group, a hydroxyl group and a carbonyl group or is one or more selected from the group consisting of polymers having a carboxyl group, an amine group, an imine group, a thiol group, a hydroxyl group and a carbonyl group.

4. A method of manufacturing a surface-functionalized-thick metal film, the method comprising:
   printing the ink for photonic annealing manufactured according to claim 1 on a substrate; and
   converting the ink for photonic annealing into a functional surface layer by irradiating the printed ink for photonic annealing with light.

5. The method according to claim 4, wherein the light irradiation is performed under an atmospheric pressure of 1 atm.

\* \* \* \* \*